United States Patent [19]

Malec

[11] 3,990,470
[45] Nov. 9, 1976

[54] MEANS FOR CONTROLLING FLUID FLOW

[76] Inventor: Jerry P. Malec, 2832 N. 70th Ave., Omaha, Nebr. 68104

[22] Filed: Dec. 6, 1971

[21] Appl. No.: 204,981

[52] U.S. Cl. ........................ 137/505.37; 137/116.5; 137/505.42
[51] Int. Cl.[2] ........................................ F16K 17/02
[58] Field of Search ....... 137/454.6, 505.36, 505.37, 137/505.38, 505.39, 505.41, 505.42, 116.5; 60/54.6; 251/DIG. 1, 335

[56] References Cited
UNITED STATES PATENTS

| | | | |
|---|---|---|---|
| 2,115,383 | 4/1938 | Christensen | 251/DIG. 1 |
| 2,738,803 | 3/1956 | Manning | 137/454.6 |
| 3,140,728 | 7/1964 | Webb | 251/DIG. 1 |
| 3,348,576 | 10/1967 | Ackerman | 137/505.18 X |
| 3,621,867 | 11/1971 | Johnson | 137/505.42 X |
| 3,682,437 | 8/1972 | Miller | 137/505.41 X |

Primary Examiner—Harold W. Weakley
Attorney, Agent, or Firm—Zarley, McKee, Thomte & Voorhees

[57] ABSTRACT

A means for controlling fluid flow including a housing having an input port adapted to be connected to a source of fluid under pressure and also havng an output port adapted to be connected to an apparatus requiring controlled fluid flow or pressure. The housing has a ring-shaped passgeway or orifice provided therein between the input and output ports and is in communicaton therewith. A valve spool is movably mounted in the housing and has an O-ring mounted thereon which is adapted to selectively close the passageway at times when the valve spool is moved in one direction with respect to the housing. One end of a stem is secured to the valve spool and extends therefrom through a seal means provided in the housing. The housing has an adjustable spring loaded diaphragm assembly positioned therein which is operatively connected to the other end of the stem. A spring means normally urges the valve spool in said one direction with the diaphragm spring means normally urging the valve spool in an opposite direction.

3 Claims, 4 Drawing Figures

INVENTOR
JERRY P. MALEC
BY
Zarley, McKee & Thomte
ATTORNEYS

MEANS FOR CONTROLLING FLUID FLOW

Conventional pressure regulators are generally of the piston or diaphragm type. The diaphragm type pressure regulators are somewhat less expensive than the piston type regulators but normally cause a restriction of air flowing through. The piston type pressure regulators are an improvement over the conventional diaphragm type regulators but are more expensive to manufacture. In conventional diaphragm regulators, the diaphragms and poppet seals are subjected to extreme wear. In the piston type pressure regulators, the seals, pistons, cylinder walls and poppet seals are exposed to extreme wear.

Pressure regulation is accomplished in most spring balance type regulators by balancing the downstream or regulated air against a large spring that is adjusted to various compression values as are required. The diaphragm or piston is the medium usually acted upon by the regulated air and the spring. When the regulated air and the spring are in equilibrium, the air controlled by the poppet or fill valve is shut off to the downstream side of the regulator. Usually a spring of the right "K" weight for a value of pressure to be regulated is necessary to provide maximum movement of the throttle valve for differences in increments of regulated pressure. The throttle valve areas in both the piston and diaphragm type regulators are quite small in relation to the size of the regulator itself. Additionally, the flow rates of the conventional regulators are not completely satisfactory in relationship to their size and the droop of the regulators is also less than satisfactory.

The pressure regulators disclosed in applicant's previous applications have been found to be very efficient in operation and the instant design represents a significant improvement over the previously disclosed regulators.

Therefore, it is a principal object of this invention to provide a means for controlling fluid flow.

A further object of this invention is to provide a flow sensor mechanism.

A further object of this invention is to provide a means for controlling fluid flow, namely a pressure regulator, which has a reduced number of parts.

A further object of this invention is to provide a pressure regulator which is many times more sensitive than conventional regulators of comparable size and flow.

A further object of this invention is to provide a pressure regulator which is chatter free at any rate of pressure flow.

A further object of this invention is to provide a pressure regulator which includes a vibration proof adjustment means thereon.

A further object of this invention is to provide a pressure regulator which is small in size but has a very high flow rate.

A further object of this invention is to provide a pressure regulator wherein the regulated pressure cannot be exceeded after the regulator has been adjusted regardless of the input pressure fluctuations.

A further object of this invention is to provide a pressure regulator which eliminates momentary overpressurization.

A further object of this invention is to provide a pressure regulator wherein all of the wearing parts may be easily inspected, cleaned and/or replaced.

A further object of this invention is to provide a pressure regulator which is extremely light weight.

A further object of this invention is to provide a pressure regulator utilizing an O-ring which flows into and out of engagement with a ring-shaped orifice.

A further object of this invention is to provide a pressure regulator which is an improvement over applicant's previous designs.

A further object of this invention is to provide a pressure regulator which has improved droop qualities.

A further object of this invention is to provide a pressure regulator which eliminates the hunting, vibration and singing phenomena associated with conventional regulators.

A further object of this invention is to provide a pressure regulator which is insensitive to dirt, moisture, oil or vibration.

A further object of this invention is to provide a pressure regulator which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

Figure 1:
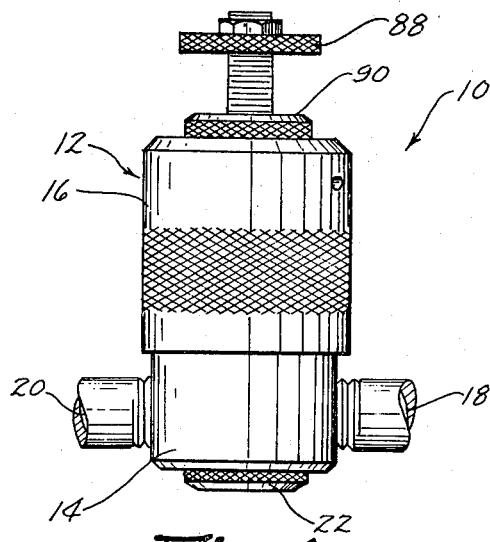
FIG. 1 is a side view of the device.
Figure 3:
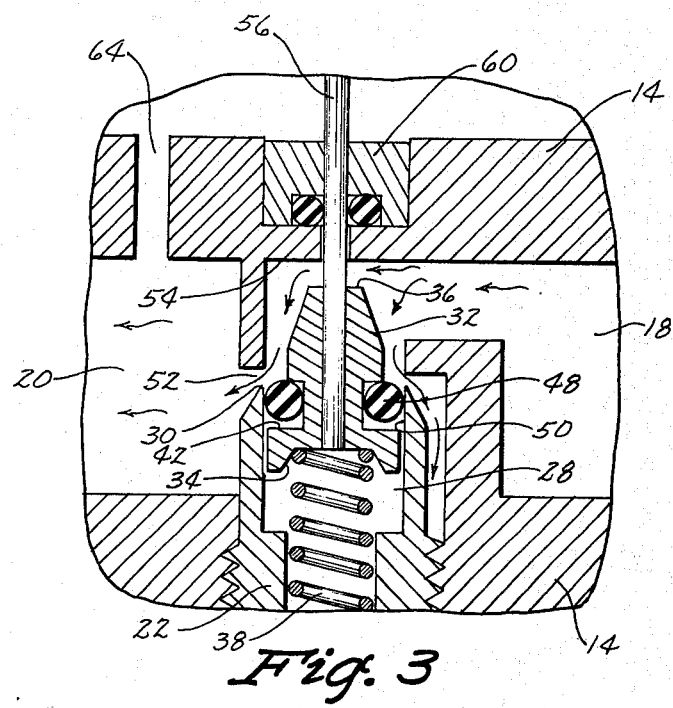
FIG. 3 is an enlarged fragmentary sectional view illustrating the valve means in an open position.

The device of this invention is generally designated by the reference numeral 10 and generally comprises a housing 12 including a body 14 and a bonnet 16 threadably secured together as illustrated in the drawings. Body 14 has an input port means 18 at one side thereof and an output port means 20 at the other side thereof. Input port 18 is adapted to be threadably connected to a conduit or the like which is in communication with a source of fluid such as air under pressure while the output port 20 is adapted to be connected to a conduit or the like which is connected to an apparatus requiring controlled or regulated fluid pressure.

Figure 2:
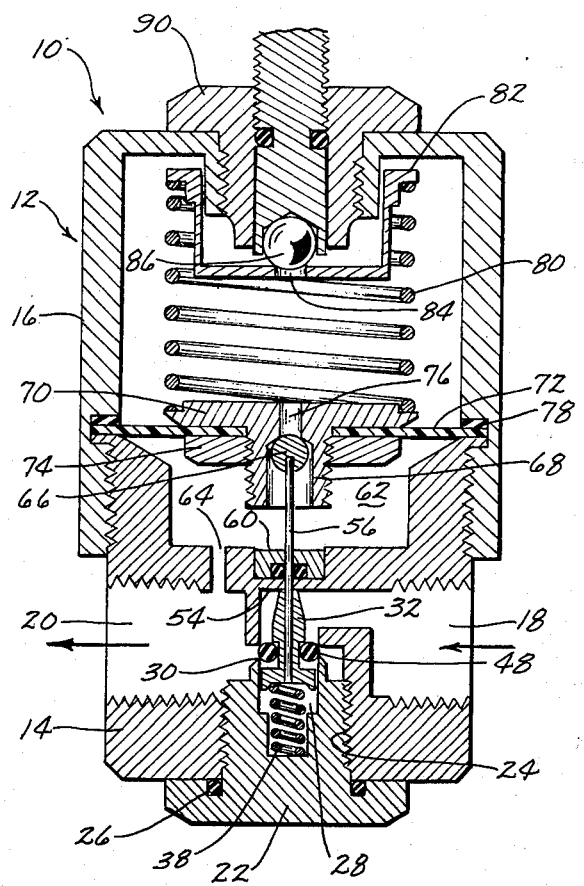
FIG. 2 is a longitudinal sectional view of the device illustrating the valve in a closed condition.
Figure 4:
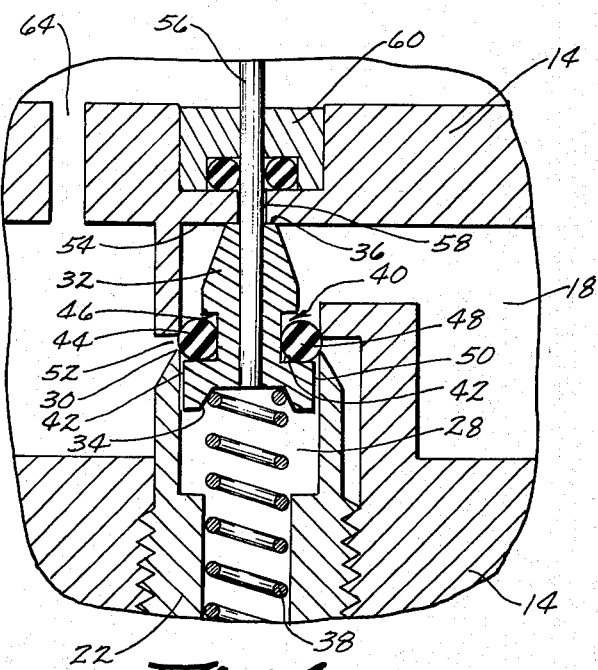
FIG. 4 is view similar to FIG. 3 except that the valve means is illustrated in a closed position.

Valve cap 22 is threadably mounted in the opening 24 in body 14 and has a valve seal 26 provided thereon. Valve cap 22 includes a bore 28 formed therein which extends inwardly from its inner end 30 as illustrated in FIG. 2. Valve spool 32 is movably mounted in the bore 28 and comprises generally a recessed end portion 34 and an end portion 36 at the other end thereof. Spring means 38 is positioned in the bore 28 to engage the recessed end portion 34 as illustrated in the drawings to normally urge valve spool 32 outwardly from the bore 28. Valve spool 32 includes a groove 40 formed therein which extends therearound defined by wall members 42, 44 and 46.

O-ring 48 is received in the groove 40 so as to embrace the valve spool and extend therearound. O-ring 48 is adapted to roll upon the wall member 44 between the wall members 42 and 46 and is adapted to roll upon the wall surface 50 defined by the bore 28. The body 14 and the inner end 30 of valve cap 22 define a ring-shaped passageway or orifice 52 which is adapted to be closed by the O-ring 48 when the valve spool 32 is in the position of FIG. 2 and is open when the valve spool has moved downwardly from the position of FIG. 2 to permit communication between the input port means 18 and the output port means 20.

As seen in FIG. 2, the end portion 36 of valve spool 32 engages the body 14 at 54 to limit the movement of the valve spool in one direction.

Stem 56 is secured at one end to the valve spool 32 and extends through opening 58 formed in body 14. A packing gland 60 embraces stem 56 so as to prevent communication between the input port means 18 and the cavity or compartment 62 in body 18. An aspirator port 64 extends between the compartment 62 and output port means 20.

The other end of stem 56 has a ball member 66 secured thereto which is received in bore 68 of spring holder 70. A diaphragm 72 is secured to the holder 70 by a holder nut 74 as illustrated in FIG. 2. Holder 70 is provided with a bore 76 which communicates with the opening 68 when the ball member 66 has moved downwardly with respect to the holder 70.

Bonnet 16 is threadably secured to the body 14 as shown in FIG. 2 and maintains the diaphragm 72 in position with the aid of a washer 78. The lower end of a spring 80 is received by the holder 70 and extends upwardly therefrom. Pusher element 82 is operatively secured to the upper end of the spring 80 and is provided with a central opening 84 formed therein which rotatably receives a ball 86 therein. The numeral 88 refers generally to an adjustment screw which is threadably mounted in a mounting sleeve 90 which is threadably secured to the bonnet 16 in the manner seen in FIG. 2. Thus, rotation of the adjustment screw 88 with respect to the bonnet 16 permits the amount of tension in spring 80 to be selectively varied so as to exert varying amounts of pressure or force on the diaphragm 72.

In operation, the input port means 18 is operatively connected to a source of fluid pressure such as air pressure with the output port means 20 being operatively connected to an apparatus requiring regulated fluid pressure. During the operation of the regulator, the O-ring 48 is essentially surrounded by the pressure medium to be regulated except at that point which is covering or sealing the orifice 52 (assuming that the valve spool 32 is in the position illustrated in FIG. 2.) As the valve spool 32 urges the O-ring 48 into a sealing position wherein the orifice 52 is covered, it can be seen that the pressure medium is confined in the inlet port areas. When the valve spool 32 urges the O-ring 48 to move or roll away from the orifice 52, it can be seen that a passageway is then provided from the input port means 18 to the output port means 20. Due to the construction described it can be seen that increases in pressure on the parts described tend to distort the O-ring 48 only slightly. The return spring 38 is provided to develop a bias on the valve spool 32 so that the valve spool 32 is urged so as to cause the O-ring 48 to cover the orifice 52. The outer periphery of the O-ring 48 is forced (by the pressure medium being controlled) to cover the orifice 52. The conventional piston, diaphragm, bellows spring assembly that is normally used in conventional pressure regulators responds to variations in downstream or regulated pressure and therefore opens and closes the valve mechanism to either open or shut the incoming higher pressure.

The width of the orifice 52 in relation to the cross-sectional area of the O-ring 48 is important when designing a stable regulator. At higher pressures, the O-ring 48 tends to extrude into the ring-shaped orifice 52. When the regulator is going to be used for pressures in the vicinity of 3000 P.S.I. it is preferred that the width of the ring-shaped orifice 52 be no greater than 5% of the O-ring 48 cross-sectional width.

The rolling O-ring structure of this invention insures that a chatter free pressure regulator is provided. In the design of this invention, no momentary over pressurization of the regulated air occurs when the regulator is initially pressurized as it comes on to the primary air line. The construction of the regulator is such that all of the wearing parts may be easily inspected, cleaned and/or replaced if necessary. The regulator may be constructed of anodized aluminum having a diameter of one and one quarter inches and a length of two and one-half inches so as to weigh approximately three ounces.

The rolling O-ring design of this invention allows the O-ring 48 to be unaffected by most increases or decreases in pressure. In conventional pressure regulators, increasing pressures normally distort the valves resilient seals therefore resulting in unwanted variations in pressure.

Thus it can be seen that a unique pressure regulator has been provided which will be long wearing and which will require only a minimum amount of maintenance. The pressure regulator of this invention has improved droop qualities. The regulator of this invention eliminates the "hunting", vibration and singing phenomena associated with conventional regulators and is insensitive to dirt, moisture, oil or vibration. Thus it can be seen that the regulator of this invention accomplishes at least all of its stated objectives.

I claim:
1. A means for controlling fluid flow, comprising,
   a housing having input and output ports formed therein, said input port adapted to be connected to a source of fluid pressure, said output port adapted to be connected to an apparatus requiring controlled fluid pressure, said housing having a passageway means provided therein, between said input and output ports and being in communication therewith,
   a valve means movably mounted in said housing adapted to selectively close said passageway means at times, said valve means including an O-ring movably mounted thereon and adapted to selectively close said passageway means when said valve means is moved in one direction with respect to said housing and to selectively open said passageway means when said valve means is moved in an opposite direction with respect to said housing, and means normally biasing said valve means in said opposite direction,
   said fluid pressure essentially surrounding said O-ring except for that portion of said O-ring which is closing said passageway means,
   said passageway means being a ring-shaped orifice extending around said valve means,
   said means biasing said valve means in said opposite direction comprising an adjustable spring biased diaphragm means operatively connected to said valve means,
   said valve means comprising a valve spool having a peripheral groove formed therein extending therearound,
   said O-ring being movably mounted in said groove, a stem means connected at one end to said valve spool and connected at its other end to said diaphragm means whereby movement of said diaphragm means in said opposite direction will move said valve means in said opposite direction.

2. The means of claim 1 wherein a return spring means engages said valve spool to normally bias said valve spool in said one direction.

3. The means of claim 1 wherein said groove has a cross-sectional width substantially greater than the cross-sectional width of said O-ring to permit said O-ring to roll thereon.

* * * * *